Patented Mar. 22, 1949

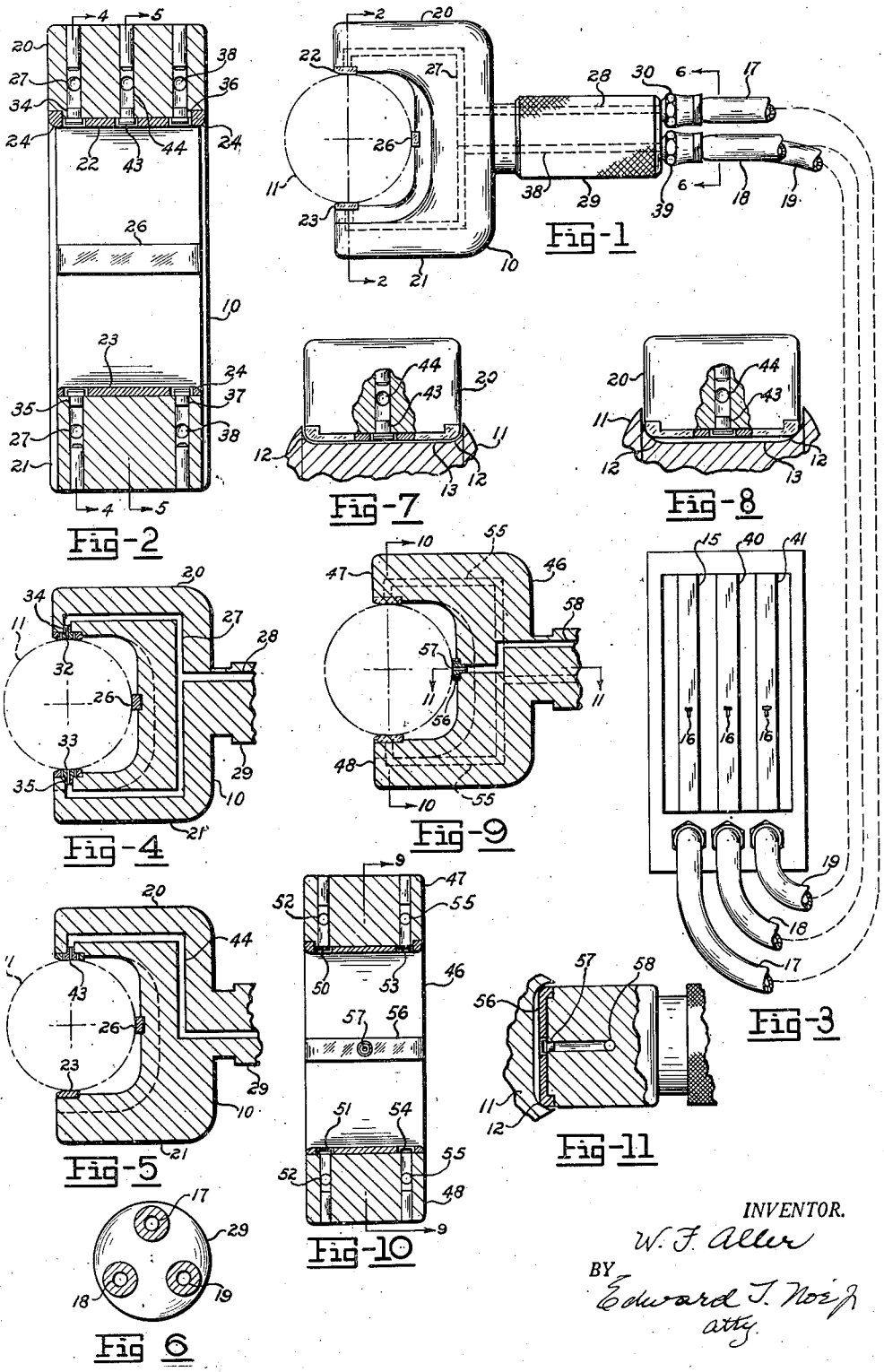

2,465,002

UNITED STATES PATENT OFFICE 2,465,002

PNEUMATIC SIZE GAUGE

Willis Fay Aller, Dayton, Ohio, assignor to The Sheffield Corporation, Dayton, Ohio, a corporation of Ohio Application April 10, 1946, Serial No. 660,903

4 Claims. (Cl. 73—37.5)

This invention relates to gauges for measuring or comparing workpieces with a part of standard size and shape.

One object of the invention is the provision of a gauging member for use in conjunction with flow measuring instruments and provided with fixed arms locating the workpiece with respect to fluid leakage gauging nozzles, the nozzle arrangement being such as to obtain a reading of the actual diameter of the work in one plane, and a reading in another plane to show the variations in the shape of the workpiece from the required form.

Another object is the provision of a gauging member of the character mentioned, in which a pair of diametrically opposed fluid leakage nozzles are arranged in axially spaced relationship with respect to an additional nozzle so that the diameters of the workpiece at different points along the workpiece can be compared.

Another object is the provision of a gauging member of the character mentioned for gauging a filleted surface of revolution, side portions of the gauging member having a predetermined curvature that interfit with workpieces of acceptable size and shape and determine the work location with respect to the additional nozzle.

Other objects and advantages of the invention will be apparent from the following description, the appended claims and the accompanying drawing, in which, Fig. 1 is a side elevation of a gauging member embodying the present invention;

Fig. 2 is a section taken on the line 2—2 of Fig. 1;

Fig. 3 is a view of a gauging apparatus having several fluid flow measuring devices for connection with the gauging member of the present invention;

Fig. 4 is a section on the line 4—4 of Fig. 2;

Fig. 5 is a section on the line 5—5 of Fig. 2;

Fig. 6 is a section on the line 6—6 of Fig. 1;

Figs. 7 and 8 are views, partly in section on the line 2—2 of Fig. 1, showing how the workpiece is located with respect to the middle gauging nozzle;

Fig. 9 is a central vertical section on the line 9—9 of Fig. 10 showing a slightly modified form of gauging member;

Fig. 10 is a section on the line 10—10 of Fig. 9; and

Fig. 11 is a section on the line 11—11 of Fig. 9.

Referring more particularly to the drawing, and with reference to the form of the invention illustrated in Figs. 1 to 8 inclusive, 10 designates a gauging member adapted for application to a workpiece shown at 11. The workpiece, as herein illustrated, may be the bearing portion 13 of a crank shaft or the like, having fillets 12 at its ends. The gauging member is particularly useful in checking a workpiece of this character to determine that the middle portion of the bearing is not undersize and that the radius of curvature of the fillets is not too large for proper cooperation with the bearings that are intended to interfit with them. Comparison readings are obtained with a master of the required size and shape so that the results found when the gauging member is applied to the workpiece itself can show any out-of-tolerance condition of size or shape of the work. These readings are obtained on flow measuring apparatus connected to the gauging member and of the character, for example, as disclosed in U. S. Letters Patent No. 2,254,259, granted September 2, 1941. Such flow measuring apparatus may comprise upright transparent tubes 15, 40, 41, having tapered passages containing floats or indicators 16, and connected at their lower ends to a source of air under constant or regulated pressure, the lower ends of the tubes extending to supply connections 17, 18 and 19 that lead to fluid passages in the gauging member. The fluid passages in the gauging member terminate in one or more fluid leakage nozzles that cooperate with the workpiece to provide a fluid leakage path determined by the size of the workpiece. The instrument measures changes in the rate of air flow through the leakage nozzles and thus forms the basis of comparison of a standard or master of the required size and shape, and the workpiece itself.

The gauging member 10 is provided with a pair of opposed work engaging arms 20 and 21 having work engaging anvils 22 and 23 which are preferably carboloy inserts. At the sides of the gauging member 10, the anvil portions are rounded as indicated at 24 so as to interfit the filleted portions of the crank shaft if the fillets are of the required radius of curvature. It will be understood that the distance between the anvils is such as to permit the entrance of workpieces that are not substantially larger than the maximum diameter tolerance requirement, and ordinarily there will be some distance between the lower anvil 23 and the workpiece, when the gauging member is applied to the workpiece, because the natural manner of applying the gauging member will be to press it downwardly, and the weight of the gauging member itself will cause the upper anvil to contact the workpiece providing a small clearance space between the workpiece and the lower anvil.

The work engaging member is also provided with a back stop anvil 26 that contacts the straight portion of the workpiece between bearing fillets, and centers the workpiece axis directly between the two work engaging anvil portions 22 and 23.

In the upper leg 20, the lower leg 21 and the body portion of the gauging member 11 is a fluid passage 27 communicating, as shown in Fig. 4, with a passage 28 in the stem or handle 29. Passage 28 is adapted to be connected as by means of the coupling 30 with a flexible tube 17 leading to the flow measuring tube 15. The passage 27 communicates with the restricted nozzle openings 32 and 33 in the gauging nozzles 34 and 35 respectively which are received within clearance holes in the carboloy inserts and inserted in holes in the leg portions of the gauging member. The surfaces of the gauging nozzles that are arranged adjacent the workpieces are spaced very slightly from the plane containing the work engaging portions of the anvils so that even if the work is directly in contact with an anvil there will be some small leakage of air taking place between the gauging nozzle and the workpiece. The size of the workpiece determines the amount of leakage that takes place, and the reading obtained by noting the level of the float 16 gives an accurate reading of the diameter of the workpiece in the plane containing the two gauging nozzles 34 and 35. This plane, as will be noted, is near one side of the gauging member, close to one of the filleted portions.

At the other side of the gauging member 11 is a similar arrangement of two diametrically opposed gauging nozzles 36 and 37 communicating with a common flow passage 38 which is preferably quite independent of the passage 27, the passage 38 being adapted for connection, as by means of the coupling 39, to the flexible pipe 18 that extends to the flow measuring tube 40. By noting the level of the float in this tube 40, the actual diameter of the workpiece in the plane containing the gauging nozzles 36 and 37 can be readily compared with a standard or master.

The two flow tubes 15 and 40 will give an accurate diameter reading even though the fillets 12 of the workpiece may be of unduly large radius, as shown in Fig. 8 for example, since it is the combination of the flow taking place through an upper and a lower nozzle that determines the reading of the float. By the use of an additional leakage nozzle in a location axially spaced from the planes containing the nozzles 34, 35 and 36, 37, and a connection from this additional nozzle to an additional flow tube 41, readings are obtainable by noting the level of the float in the tube 41, to show the operator whether the curvature of the fillets of the workpiece is too large. This additional nozzle is shown at 43 and is in communication with a passage 44 adapted for connection to the tube 19 leading to flow tube 41 and quite independent of the passages 28 and 38 in the gauging member 10, as shown in Fig. 5. The leakage that takes place between the gauging nozzle 43 and the workpiece, and the reading shown by the float in the tube 41, will be the normal or standard amount as determined by the master if the upper side of the workpiece is in full contact with the straight portion of the upper anvil 22, see Fig. 7, if the straight portion is a true cylinder. This will be the case since the downward pressure of the gauging member 10 on the workpiece holds the upper anvil on the upper surface. Thus if the fillets 12 are of small enough radius to satisfy the required standard or tolerance conditions, a normal reading will show on the flow tube 41 regardless of the diameter of the workpiece, assuming the diameter of the workpiece is uniform between the fillets. If the central portion of the bearing is undersize, or if the fillets are of too large a radius, the distance between the exposed end of the nozzle 43 and the upper side of the workpiece will be increased, resulting in a greater leakage flow of fluid and causing elevation of the float in the tube 41 to a point above its normal or permissible height. In this way it will be apparent that in one operation the actual diameters of the bearing portion of the shaft at points near its filleted portions can be accurately found or compared to a standard, and at the same time and with no further operations, the operator can also determine whether the shape of the workpiece is proper, that is, whether the fillets have too large a radius or the diameter of the central portion of the bearing is undersize to an excessive amount.

In the form of construction shown in Figs. 1 to 8 inclusive, the additional nozzle 43 is arranged in the upper arm 20 of the gauging member 10. This additional gauging nozzle may be arranged in the back stop, as illustrated in the form of construction shown in Figs. 9, 10 and 11. As shown in those figures, the gauging member 46 has arms 47 and 48 provided with a pair of diametrically opposed gauging nozzles 50 and 51 at one side of the arms, connected to one passage 52 in the gauging member, and a second pair of diametrically opposed gauging nozzles 53 and 54 at the other side of the gauging member, connected to a second fluid passage 55, just as in the form of construction shown in Figs. 1 to 8. The fluid passages 52 and 55 are adapted for connection to the tubes 17 and 18 of the flow gauging tubes 15 and 40 to give a measurement of the actual diameters of the workpiece in the transverse planes containing these gauging nozzles. The back stop 56 at its side portions, is curved so as to properly interfit the workpiece 11 if the fillets 12 of the workpiece are of small enough radius to meet the required tolerance conditions so that regardless of the diameter of the cylindrical portion of the workpiece the same quantity of air flow will take place from the additional gauging nozzle 57 which is provided in a central portion of this back stop 56 in communication with a fluid passage 58 that is independent of the passages 52 and 55. Fluid passage 58 is adapted for connection to the flexible tube 19 that leads to the flow measuring tube 41. If the workpiece has fillets of too large a radius, or if the middle portion of the workpiece bearing is undersize, thus there will be an increased distance between the workpiece and the middle portion of the back stop, resulting in an increased amount of leakage through the nozzle 57 and this will be apparent by a rise in the float contained in the flow tube 41.

The drawings show exaggerated conditions of spacing and clearance. Actually there may be only a few thousandths of an inch between the outer surfaces of the nozzles and the workpiece even when the portions immediately adjacent the nozzles are in direct contact with the workpiece, and when the fillets on the work are of too large a radius and the additional nozzle is spaced still farther from the workpiece its spacing, even then, may still be measured in thousandths of an inch.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A gauging member for gauging a surface of of revolution of a workpiece comprising a block having spaced legs for straddling the work, said legs having a pair of diametrically opposed fluid leakage nozzles, said block having an additional nozzle spaced in the direction of the work axis from the pair of nozzles and having a stop surface for locating the additional nozzle at a definite normal spacing from the workpiece surface of acceptable size and shape, said block having a fluid supply passage connected to both the opposed nozzles and having a second fluid supply passage independent of the first passage and connected to the additional nozzle, the said fluid passages being adapted for connection to flow gauges.

2. A gauging member for gauging a filleted surface of revolution of a workpiece comprising a block having spaced legs for straddling the work, said legs having a pair of diametrically opposed fluid leakage nozzles, said block having an additional nozzle spaced in the direction of the work axis from the pair of nozzles, said block having a fluid supply passage connected to both the opposed nozzles and having a second fluid supply passage independent of the first passage and connected to the additional nozzle, the said fluid passages being adapted for connection to flow gauges, side portions of the block in the proximity of said additional nozzle having a predetermined curvature that interfits workpieces of acceptable size and shape and determines the work location with respect to the said additional nozzle.

3. A gauging member for gauging a surface of revolution of a workpiece comprising a block having spaced legs for straddling the work, said legs having a pair of diametrically opposed fluid leakage nozzles at one side of the block and a second pair of diametrically opposed fluid leakage nozzles at the other side of the block, said block having an additional nozzle arranged between the two pairs of diametrically opposed nozzles, said block having fluid supply passages one for each pair of diametrically opposed nozzles and having another fluid supply passage independent of the first mentioned fluid supply passages and connected to the additional nozzle, the said fluid passages being adapted for connection to separate flow gauges.

4. A gauging member for gauging a filleted surface of revolution of a workpiece comprising a block having spaced legs for straddling the work, said legs having a pair of diametrically opposed fluid leakage nozzles at one side of the block and a second pair of diametrically opposed fluid leakage nozzles at the other side of the block, said block having an additional nozzle arranged between the two pairs of diametrically opposed nozzles, said block having a fluid supply passage for each pair of diametrically opposed nozzles and having another fluid supply passage independent of the first mentioned passages and connected to the additional nozzle, the said fluid passages being adapted for connection to separate flow gauges, side portions of the block having a predetermined curvature that interfits workpieces of acceptable size and shape and determines the work location with respect to the additional nozzle.

WILLIS FAY ALLER.

REFERENCES CITED

The following references are of record in the file of this patent:

UNITED STATES PATENTS

| Number | Name | Date |
|---|---|---|
| 1,971,271 | Mennesson | Aug. 21, 1934 |
| 2,019,066 | Balsiger | Oct. 29, 1935 |
| 2,306,469 | Rupley | Dec. 29, 1942 |